(12) United States Patent
Mansikkasalo et al.

(10) Patent No.: US 10,655,849 B2
(45) Date of Patent: May 19, 2020

(54) METHOD FOR CONTROLLING A RECOVERY BOILER

(71) Applicant: Valmet Automation Oy, Espoo (FI)

(72) Inventors: Jarmo Mansikkasalo, Pirkkala (FI); Jukka Koskinen, Tampere (FI)

(73) Assignee: Valmet Automation Oy, Espoo (FI)

( * ) Notice: Subject to any disclaimer, the term of this patent is extended or adjusted under 35 U.S.C. 154(b) by 127 days.

(21) Appl. No.: 15/997,140

(22) Filed: Jun. 4, 2018

(65) Prior Publication Data

US 2018/0363900 A1 Dec. 20, 2018

(30) Foreign Application Priority Data

Jun. 20, 2017 (FI) .................................... 20175578

(51) Int. Cl.
*F23B 90/00* (2011.01)
*F23J 15/02* (2006.01)
(Continued)

(52) U.S. Cl.
CPC ........... *F23J 15/025* (2013.01); *D21C 11/066* (2013.01); *D21C 11/106* (2013.01); *D21C 11/12* (2013.01);
(Continued)

(58) Field of Classification Search
CPC . D21C 11/106; D21C 11/066; D21C 11/0007; D21C 11/0042; D21C 3/20;
(Continued)

(56) References Cited

U.S. PATENT DOCUMENTS

| | | | |
|---|---|---|---|
| 5,961,803 | A | 10/1999 | Landfors et al. |
| 2006/0236696 | A1 | 10/2006 | Saviharju et al. |
| 2016/0222587 | A1 | 8/2016 | Fatehi et al. |

FOREIGN PATENT DOCUMENTS

| | | | |
|---|---|---|---|
| EP | 2003242 A1 | 12/2008 | |
| JP | 2971279 B2 | 11/1999 | |

(Continued)

OTHER PUBLICATIONS

Finnish Patent and Registration Office, Office Action No. 20175578, dated Feb. 20, 2018, 7 pages, Finland.
(Continued)

*Primary Examiner* — Jason Lau
(74) *Attorney, Agent, or Firm* — Alston & Bird LLP (57) ABSTRACT

The method in a recovery boiler comprises estimating the first melting temperature $T_0$ of the fly ash depositing on heat transfer surfaces, the estimating being based on potassium (K) content of the fly ash; measuring or estimating the temperature $T_{ss}$ of superheated steam; evaluating a temperature difference $T_{D1}$ between the first melting temperature $T_0$ and the temperature $T_{ss}$ of the superheated steam, the temperature difference $T_{D1}$ providing an estimate of the risk of corrosion; and selecting a control action for influencing the temperature difference $T_{D1}$. Alternatively or additionally, the method comprises estimating the sticky temperature $T_{STK}$ of the fly ash depositing on heat transfer surfaces, the estimating being based on potassium (K) and chlorine (Cl) contents of the fly ash; measuring or estimating the temperature $T_{FG}$ of the flue gases; evaluating a temperature difference $T_{D2}$ between the sticky temperature $T_{STK}$ and the temperature $T_{FG}$ of the flue gases; the temperature difference $T_{D2}$ providing an estimate of the risk of plugging; and selecting a control action for influencing the temperature difference $T_{D2}$.

10 Claims, 3 Drawing Sheets

(51) Int. Cl.
*F22G 1/02* (2006.01)
*F22G 5/04* (2006.01)
*F23G 7/04* (2006.01)
*F23J 1/00* (2006.01)
*F22D 1/12* (2006.01)
*D21C 11/06* (2006.01)
*D21C 11/10* (2006.01)
*D21C 11/12* (2006.01)

(52) U.S. Cl.
CPC ............... *F22D 1/12* (2013.01); *F22G 1/02* (2013.01); *F22G 5/04* (2013.01); *F23G 7/04* (2013.01); *F23J 1/00* (2013.01)

(58) Field of Classification Search
CPC .. D21C 3/222; D21C 11/0085; D21C 11/063; D21C 11/12; D21C 11/14; F23J 9/00; F23J 15/022
See application file for complete search history.

(56) References Cited

FOREIGN PATENT DOCUMENTS

| WO | WO 2000/02966 A1 | 1/2000 |
| WO | WO 03/095738 A1 | 11/2003 |
| WO | WO 2008/129117 A1 | 10/2008 |

OTHER PUBLICATIONS

Tran, Honghi, "Recovery Boiler Fireside Deposits And Plugging Prevention", TAPPI Kraft Recovery, Course, 2008, uploaded to ResearchGate by author on Jan. 28, 2015, pp. 4.7-1 to -12.

Vakkilainen, Esa K., "Kraft recovery boilers—Principles and practice", 2005, 246 pages, Suomen Soodakattilayhdistys r.y., Finland.

METHOD FOR CONTROLLING A RECOVERY BOILER

CROSS REFERENCE TO RELATED APPLICATIONS

This application claims priority to and the benefit of Finnish Patent Application No. 20175578, filed on Jun. 20, 2017, the contents of which as are hereby herein incorporated by reference in their entirety.

BACKGROUND

Related Field

The solution to be presented relates to a method for controlling a recovery boiler.

Description of Related Art

As a result of developments in recovery boiler technology and recovery boiler control methods, more and more electricity is produced. However, problems in the recovery boiler is caused by accumulation of non-process elements, or NPE's, during combustion of black liquor. Especially chloride (Cl) and potassium (K) cause problems of corrosion, plugging and fouling in the superheater area and the boiler bank of the recovery boiler.

The most common way to regulate Cl and K levels in the recovery boiler is to purge the fly ash collected in an electrostatic precipitator (ESP), i.e. the ESP ash, and not to recirculate it to the black liquor before the black liquor is fed to the recovery boiler. A major economical drawback involved in purging the ESP ash is that the ESP ash mainly consists of recoverable cooking chemicals such as sodium (Na) and sulphur (S), which have to be replaced with make-up chemicals in the kraft pulping process from which the black liquor originates. Also, there may be problems related to environmental aspects when purging the ESP ash.

Furthermore, it is common that the Cl and K levels of the ESP ash are not measured or determined at sufficiently frequently to deal with risks related to the corrosion, plugging and fouling dynamically.

BRIEF SUMMARY

The presented solution is a method for controlling a recovery boiler according to a first alternative. The recovery boiler comprises a furnace for black liquor combustion, and a superheater area having one or more superheaters recovering heat from a stream of flue gases coming from the furnace.

The recovery boiler may further comprise a boiler bank and at least one economizer recovering heat from a stream of flue gases coming from the furnace and an electrostatic precipitator collecting fly ash from the stream of flue gases.

The method comprises estimating the first melting temperature $T_0$ of the fly ash depositing on heat transfer surfaces of the superheater area, the estimating being based on, at least, potassium (K) content of the fly ash; measuring or estimating the temperature $T_{ss}$ of superheated steam circulating in or output from the superheater area, or, one or more superheaters of the superheaters; evaluating a temperature difference $T_{D1}$ between the first melting temperature $T_0$ and the temperature $T_{ss}$ of the superheated steam, the temperature difference $T_{D1}$ providing an estimate of the risk of corrosion at the superheater area or said one or more superheaters; and selecting a control action for performing control of the recovery boiler and influencing the temperature difference $T_{D1}$.

According to some examples of the presented solution, the control action is purging the fly ash, treating the fly ash or decreasing the temperature $T_{ss}$, or a combination of two or more of these actions.

The presented solution is a method for controlling a recovery boiler according to a second alternative. The recovery boiler comprising a furnace for black liquor combustion, a superheater area having one or more superheaters and a boiler bank recovering heat from a stream of flue gases coming from the furnace.

The recovery boiler may further comprise at least one economizer recovering heat from a stream of flue gases coming from the furnace and an electrostatic precipitator collecting fly ash from the stream of flue gases.

The method comprises estimating the sticky temperature $T_{STK}$ of the fly ash depositing on heat transfer surfaces of the superheater area and the boiler bank, the estimating being based on, a least, potassium (K) and chlorine (Cl) contents of the fly ash; measuring or estimating the temperature $T_{FG}$ of the flue gases flowing at the boiler bank, or the superheater area or one or more superheaters of the superheaters; evaluating a temperature difference $T_{D2}$ between the sticky temperature $T_{STK}$ and the temperature $T_{FG}$ of the flue gases; the temperature difference $T_{D2}$ providing an estimate of the risk of plugging at the boiler bank, or the superheater area or said one or more superheaters; and selecting a control action for performing control of the recovery boiler and influencing the temperature difference $T_{D2}$.

According to some examples of the presented solution, the control action is purging the fly ash, treating the fly ash, decreasing the temperature $T_{FG}$, controlling combustion of black liquor, cleaning the heat transfer surfaces, or a combination of two or more of these actions.

Furthermore, the first and second alternatives of the presented solution for controlling a recovery boiler according may be combined or carried out simultaneously for providing to a more comprehensive method.

BRIEF DESCRIPTION OF THE FIGURES

In the following, the presented solution will be described in more detail with reference to the appended figures.

DETAILED DESCRIPTION OF VARIOUS EMBODIMENTS

Black liquor from a kraft pulping process has a high energy value which makes it a source for energy production. Since black liquor contains process chemicals, it is desirable to regenerate them and recirculate them to the kraft pulping process. This is accomplished in a chemical recovery cycle, including combustion of black liquor in a recovery boiler. The purpose of combustion of black liquor in the furnace of the recovery boiler is to extract the latent heat in the organic material of the black liquor and to recover sodium (Na) and sulphur (S) compounds in the form of sodium carbonate ($Na_2CO_3$) and sodium sulfide ($Na_2S$) in the smelt formed in the recovery boiler. Elements which do not play a useful role in the chemical recovery cycle are classified as non-process elements (NPE). Examples of non-process elements include chlorine (Cl), potassium (K), phosphor (P), calcium (Ca), magnesium (Mg) and manganese (Mn).

Black liquor having a dry solids content of approximately 70-80% of weight is burned in the recovery boiler and heat is transferred from the hot flue gases to a steam generating system. The steam is then used to generate electricity with steam turbines.

Figure 1:
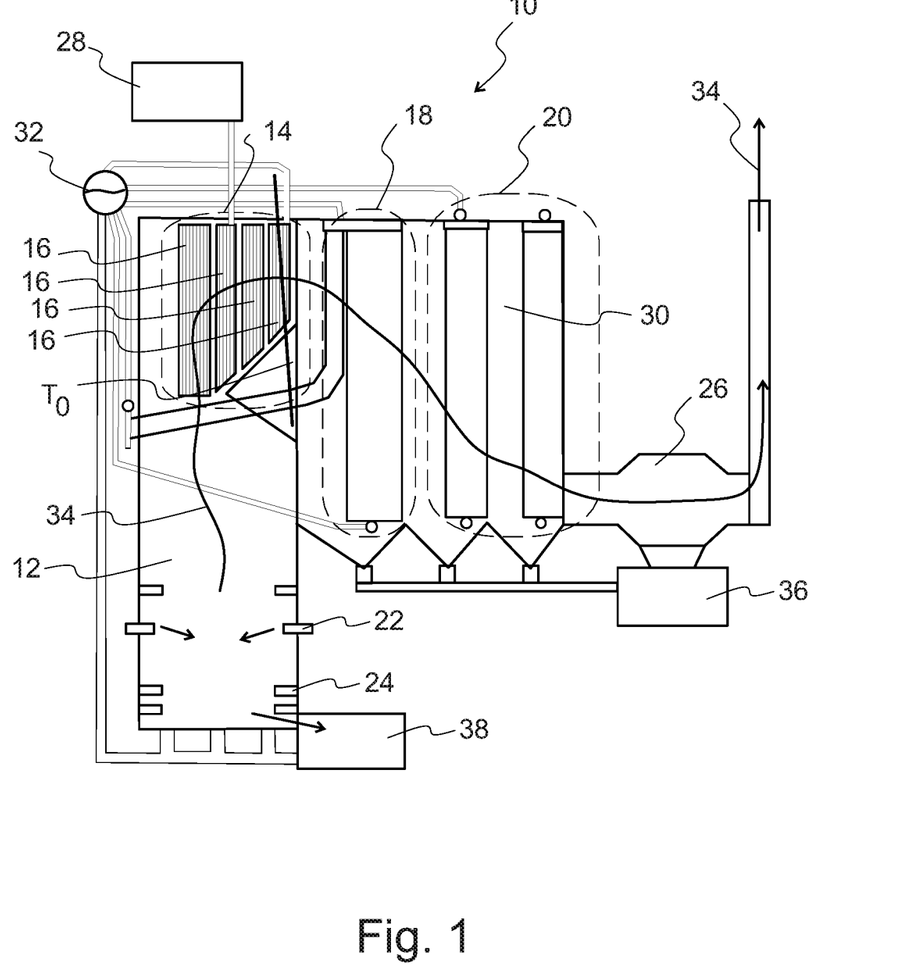
FIG. 1 shows a schematical view of a recovery boiler in which the method according to the presented solution is applied.

FIG. 1 shows an example of a recovery boiler 10 with a steam generating system providing steam to a steam turbine system 28. The recovery boiler 10 further provides an ash collecting and conveying system 36.

The recovery boiler 10 may comprise a furnace 12, i.e. a reactor part, a superheater area 14 with one or more superheaters 16, a steam generating boiler bank 18 and for example an economizer region with at least one economizer 20 for preheating the medium circulating in the walls of the recovery boiler 10. The superheater area 14, said one or more superheaters 16 and the boiler bank 18, and the economizer 20, provide the recovery boiler 10 with heat transfer surfaces enabling heat transfer. The boiler bank 18 may have a particulate collection container, i.e. a hopper, for collecting dust entrained in flue gases. Also, the economizer 20 may have a particulate collection container, i.e. a hopper, for collecting dust carried by flue gases.

The furnace 12 is surrounded by the walls of the recovery boiler 10. The walls of the recovery boiler 10 are, at least partly, made of tubes connected together by welding. There is medium circulation inside the tubes, which medium circulation is substantially water-steam circulation. The walls of the recovery boiler 10 comprise nozzles 22, by means of which black liquor is supplied to the furnace 12 for combustion. In addition, the walls of the recovery boiler 10 comprise air nozzles 24 for supplying the air required for combustion. Air supply may take place in various locations in the furnace 12. Smelt spouts are located in the lower part of the furnace 12 for conveying smelt to a dissolving tank 38.

In the recovery boiler 10 the superheater area 14 with the one or more superheaters 16 may be located in the upper part of the furnace 12 in the top part of the recovery boiler 10. The boiler bank 18 and the economizer 20 may be located in a flue gas channel 30, i.e. a second pass, through which flue gases 34 coming from the furnace 12 flow to an electrostatic precipitator 26. The electrostatic precipitator 26 (ESP) removes dust, i.e. fly ash, from the flow of flue gases. Preferably, the boiler bank 18 is located downstream of the superheater area 14 and the economizer 20 is located downstream of the boiler bank 18.

Steam flowing in the superheater 16 is converted into superheated steam by means of the hot flue gases flowing past the superheater 16 and heat convection. The high pressure superheated steam output from the superheater 16 and the superheater area 14 is led to e.g. a steam turbine system having a steam turbine 28. Inside the superheater area 14, steam from one superheater 16 may be led to another superheater 16. Water flowing in the economizer 20 is preheated by means of the flue gases flowing past the economizer 20 and by heat convection. The preheated water is fed to the medium circulation of the furnace 12 and the recovery boiler 10. Water flowing inside the boiler bank 18 is converted into a water-steam mixture by means of the cooled flue gases flowing past the boiler bank 18 and heat convection. Saturated steam is separated from the water-steam mixture and the saturated steam is led to the superheater 16 and the superheater area 14. The recovery boiler 10 may include at least one reservoir 32, i.e. a drum, for the water-steam mixture. The separation of saturated steam may take place in the drum.

The flue gases contain high amounts of dust. When the steam temperature increases the temperature of the heat transfer surfaces increases as well. If the temperature gets high enough the dust will melt and stick onto the heat transfer surfaces and cause corrosion and plugging of the heat transfer surfaces.

Non-process elements Cl and K enter the recovery boiler 10 in the black liquor fed to the furnace 12 of the recovery boiler 10. At the high temperature of the furnace 12, compounds of Cl and K vaporize and finally Cl and K become enriched in the dust collected in the electrostatic precipitator 26, i.e. ESP ash, and caught by the hoppers of the boiler bank 18 and the economizer 20, and in deposits on the heat transfer surfaces.

Built-up of deposits cause plugging and corrosion on the heat transfer surfaces and in the flue gas passages of the superheater area 14 and the boiler bank 18. The presence of Cl and K in the deposits has a strong effect on the thermal properties of the deposits in the recovery boiler 10.

The deposits, being mixtures of chemical compounds, melt gradually in a temperature interval that may be several hundred degrees Celsius. There are two distinct melting temperatures of the deposits. The first melting temperature $T_0$, is the temperature at which liquid phase first appears. Above the first melting temperature $T_0$ the deposit is highly corrosive. The second distinct melting temperature is the temperature at which the deposit is completely molten, i.e. the molten temperature $T_{100}$. Between these two temperatures there are at least two other important temperatures. The sticky temperature $T_{STK}$, is the temperature above which the deposits contain enough liquid phase to become sticky. The sticky temperature $T_{STK}$ is the temperature at which the proportion of the liquid phase in the deposits exceeds 10-30%, typically 15%. The radical deformation temperature $T_{RD}$, i.e. the flow temperature, is the temperature above which the amount of the liquid phase is sufficient to make the deposit fluid. The deformation temperature $T_{RD}$ is the temperature at which the proportion of the liquid phase in the deposits typically exceeds 70%. Stickiness of deposits is one of the most important factors that determine the rate of deposition on the heat transfer surfaces.

The sticky temperature $T_{STK}$ and the radical deformation temperature $T_{RD}$, are important for the rate of accumulation of deposits. Below $T_{STK}$ the deposits are relatively dry and do not tend to accumulate. Above $T_{RD}$ the accumulation of deposits decreases since the deposits run off. The effect of Cl on $T_{STK}$ and $T_{RD}$ for a typical deposit is that both $T_{STK}$ and $T_{RD}$ decrease with the increasing Cl content of the deposits. The effect of K content is much less significant when Cl content is low. However, high K concentration of deposits decreases the first melting temperature $T_0$. A low first melting temperature $T_0$ tends to increase the susceptibility to corrosion of the superheater 16. Thus, increasing the first melting temperature $T_0$ of deposits reduces the risk of corrosion. The most vulnerable area for corrosion is at the superheaters 16 or in the superheater area 14, since the highest steam temperatures are found there. Especially vulnerable for corrosion is the superheater 16 with the highest steam temperature, typically, the second superheater downstream in a group of four superheaters.

Due to the stickiness of the fly ash in the flue gases deposits accumulate on the heat transfer surfaces of the boiler bank 18 and the superheater area 14 causing fouling and plugging of the flue gas passages. The inlet of the boiler bank 18 with relatively narrow flue gas passages is the most common location for plugging. One of the superheaters 16 of the superheater area 14 may have narrower flue gas passages than the other superheaters 16 of the superheater area 14 and therefore may become plugged as well. Typically, said one superheater 16 is located downstream of all the other superheaters 16. Also, the temperature of the flue gases at the inlet and at the superheater 16 is typically in the temperature range between the sticky temperature $T_{STK}$ and the radical deformation temperature $T_{RD}$, the temperature range defining a sticky region.

Therefore, it is vital to keep the flue gases at a temperature below the sticky temperature $T_{STK}$ before the flue gases enter the boiler bank 18 or the superheater 16 with relatively narrow flue gas passages. Another method is to minimize the sticky region since it results in a more narrow temperature range where the fly ash may cause plugging. The sticky region can be minimized by lowering the Cl content, and the K content, of the fly ash. Yet another method is to lower the temperature of the flue gases as rapidly as possible since a slow temperature decrease will have the consequence that the fly ash carried by the flue gases will be sticky for a longer period of time. The rapid reduction of the temperature of the flue gases is accomplished by reducing loading of the furnace 12 and the recovery boiler 10 or when the heat transfer surfaces are clean, such as after cleaning the heat transfer surfaces, but it will gradually slow down because of the formed deposits.

Plugging of the heat transfer surfaces is prevented, for example, through steam blowing using sootblowers. Another method for avoiding plugging is to lower the amount of carryover deposits which may be accomplished by tuning of different process parameters of the recovery boiler, especially the process parameters related to the combustion of black liquor. The carryover deposits comprise black liquor solids or smelt particles entrained in the flue gases.

It is possible to estimate the Cl and/or K content of the deposits on the heat transfer surfaces by analysing the Cl and/or K content of the fly ash, for example the ESP ash or the fly ash caught by the hoppers, or the fly ash carried by the stream of flue gases and collected, for example, with a sampling probe. The Cl and/or K content of the deposits should be kept at a suitable level to avoid corrosion and plugging. Also, the temperature and pressure of the superheated steam should be increased or kept at a high level so that an economically viable solution is provided with regard to electricity production.

Fly ash may be recirculated to the black liquor before the black liquor is fed to the furnace 12 of the recovery boiler 10. A way of controlling Cl and K levels of the black liquor fed to the recovery boiler 10 is to purge fly ash, for example ESP ash, without recirculating it, or, to reduce or change the amount of recirculated fly ash or to increase or change the amount of fly ash purged. However, this may not be economically viable as the purged material includes sodium (Na) and sulphur (S) compounds in the form of sodium carbonate ($Na_2CO_3$) and sodium sulfate ($Na_2SO_4$), sodium (Na) and sulphur (S) being recoverable and needed in the kraft pulping process. Consequently, make-up chemicals must be added to the liquor cycle of the kraft pulping process in order to compensate for the loss of process chemicals when purging fly dust.

Cl and/or K may be removed from the fly ash in an ash treating process, in which the fly ash is treated for example by leaching. The treated fly ash is then recirculated to the black liquor.

In the presented solution, the K content of the fly ash is measured or determined by analysis. The fly ash may be ESP ash or originate from the stream of flue gases, the hopper of the boiler bank 18 or the economizer 20. This may be accomplished with known, already available methods. Based on the K content of the fly ash, an estimate for the first melting temperature $T_0$ in relation to the deposits on the heat transfer surfaces of the boiler bank 18 and/or the superheater area 14 can be calculated or determined to estimate the risk for corrosion. The estimate may be based on known studies and tables showing the relationship between the K content and the first melting temperature $T_0$. Preferably, the Cl content of the fly ash, and/or the Na content of the fly ash, and/or carbonates in the fly ash, i.e. $CO_3$, and/or sulfates in the fly ash, i.e. $SO_4$, is measured or determined by analysis together with the K content to estimate the risk for corrosion.

The heat transfer surfaces of the boiler bank 18 and/or the superheater area 14 are provided with tubes on which deposits of fly ash are formed and inside which steam or water-steam mixture flows. When there is an adequately large temperature difference between the surface of the tubes and the first melting temperature $T_0$, a thick protective layer of solid deposits is formed on the tubes which keeps the tubes safe from the corrosive liquid phase of the deposits. The preferred thickness of the protective layer or the temperature difference required may be selected on the basis of the material of the tubes. When the temperature of the surface of the tubes increases to equal the first melting temperature $T_0$, the tubes will corrode heavily.

The above-mentioned temperature difference may be estimated on the basis if the temperature of the steam or water-steam mixture flowing in the tubes. Therefore, the temperature $T_{ss}$ of the superheated steam circulating in or outputted from one or more of the superheaters 16 in the superheater area 14 is measured or determined, the determination being based on other process data related to the steam generating system including said one or more superheaters 16 or the recovery boiler 10.

In the first example of the presented solution, the risk of corrosion of the tubes in the superheater area 14 or one or more of the superheaters 16 in the superheater area 14 is estimated on the basis of the temperature difference $T_{D1}$ between the estimated first melting temperature $T_0$ and the temperature $T_{ss}$ of the superheated steam. The risk of corrosion increases when the temperature difference $T_{D1}$ decreases.

FIG. 1 shows one example of the approximate location at which the temperature of the flue gases 34 corresponds to the first melting temperature $T_0$. Upstream of the location, the temperature of the flue gases 34 increases.

Preferably, when the temperature difference $T_{D1}$ decreases below a predetermined level, i.e. a temperature difference $T_{DMIN1}$, or settles in a predetermined temperature range, i.e. a temperature range $T_{R1}$, one or more control actions are performed to control the operation of the recovery boiler 10 such that the temperature difference $T_{D1}$ will increase above the predetermined level again or will leave the predetermined temperature range. The predetermined level and/or the predetermined temperature range may be a parameter to be set and may be selected on the basis of the material of the superheater 16 or the superheater area 14.

Economical or technical aspects in relation to the control actions performed may not justify increasing the temperature difference $T_{D1}$ to an excessively high level. Especially, purging fly ash would not necessarily be economically viable.

Preferably, when the temperature difference $T_{D1}$ increases above a predetermined level, i.e. a temperature difference $T_{DMAX1}$, or settles on a predetermined temperature range, i.e. a temperature range $T_{RM1}$, one or more control actions are performed to control the operation of the recovery boiler 10 such that the temperature difference $T_{D1}$ will again decrease below the predetermined level or leaves the predetermined temperature range. The predetermined level and/or the predetermined temperature range may be a parameter to be set and may be selected on the basis of the material of the superheater 16 or the superheater area 14.

The control action may be firstly, purging the fly ash, either completely or in part, without recirculating it or recirculating it only in part; and secondly, treating the fly ash in an ash treating process, either completely or in part; and thirdly, decreasing the temperature $T_{ss}$ of the superheated steam in or output from one or more of the superheaters 16 of the superheater area 14, for example by spraying water into the steam; and fourthly, controlling combustion of black liquor in the furnace 12; and fifthly, a combination of one or more of the above-mentioned control actions.

Preferably, the control action selected is either the decreasing of the temperature $T_{ss}$ of the superheated steam or the purging of the fly ash, or both.

In the second example of the presented solution, both the Cl content and the K content of the fly ash is measured or determined by analysis. This may be accomplished with known, already available methods. The fly ash may be ESP ash or originate from the stream of flue gases, the hopper of the boiler bank 18 or the economizer 20. Based on the K and Cl contents of the fly ash, an estimate for the sticky temperature $T_{STK}$ in relation to the deposits on the heat transfer surfaces of the boiler bank 18 and/or the superheater area 14, and/or the economizer region if necessary, can be calculated or determined to estimate the risk of plugging. The estimate may be based on known studies and tables showing the relationship between the K and Cl contents and the sticky temperature $T_{STK}$. Preferably, the Na content of the fly ash, and/or carbonates in the fly ash, i.e. $CO_3$, and/or sulfates, i.e. $SO_4$, in the fly ash is measured or determined by analysis together with the K and Cl contents to estimate the risk of plugging.

As discussed above, at the sticky temperature $T_{STK}$ the fly ash is partly molten, becomes sticky, and tends to accumulate and stay on the heat transfer surfaces of the boiler bank 18 and the superheater area 14. The fly ash remains sticky until the molten fraction is typically more than 70% after which it is fluid enough to flow off the heat transfer surfaces. Therefore the sticky area region determined by the sticky temperature $T_{STK}$ and the radical deformation temperature $T_{RD}$ should be upstream of the boiler bank 18 or the superheater 16 where spacing between the tubes is smaller and the flue gas passages are narrower than in the superheater area 14 or at the other superheaters 16.

Therefore, the temperature $T_{FG}$ of the flue gases flowing past the boiler bank 18 is measured or estimated e.g. by calculations related to heat balance. The temperature $T_{FG}$ at the boiler bank 18, downstream of the boiler bank 18 or within the boiler bank 18 is measured. Preferably, the temperature $T_{FG}$ at the inlet of the boiler bank 18 or immediately upstream of the boiler bank 18 is measured or determined. In the case where a superheater 16 of the superheater area 14 has relatively narrow flue gas passages, the temperature $T_{FG}$ at the inlet of the superheater 16 or immediately upstream of the superheater 16 is measured or determined.

Figure 2:
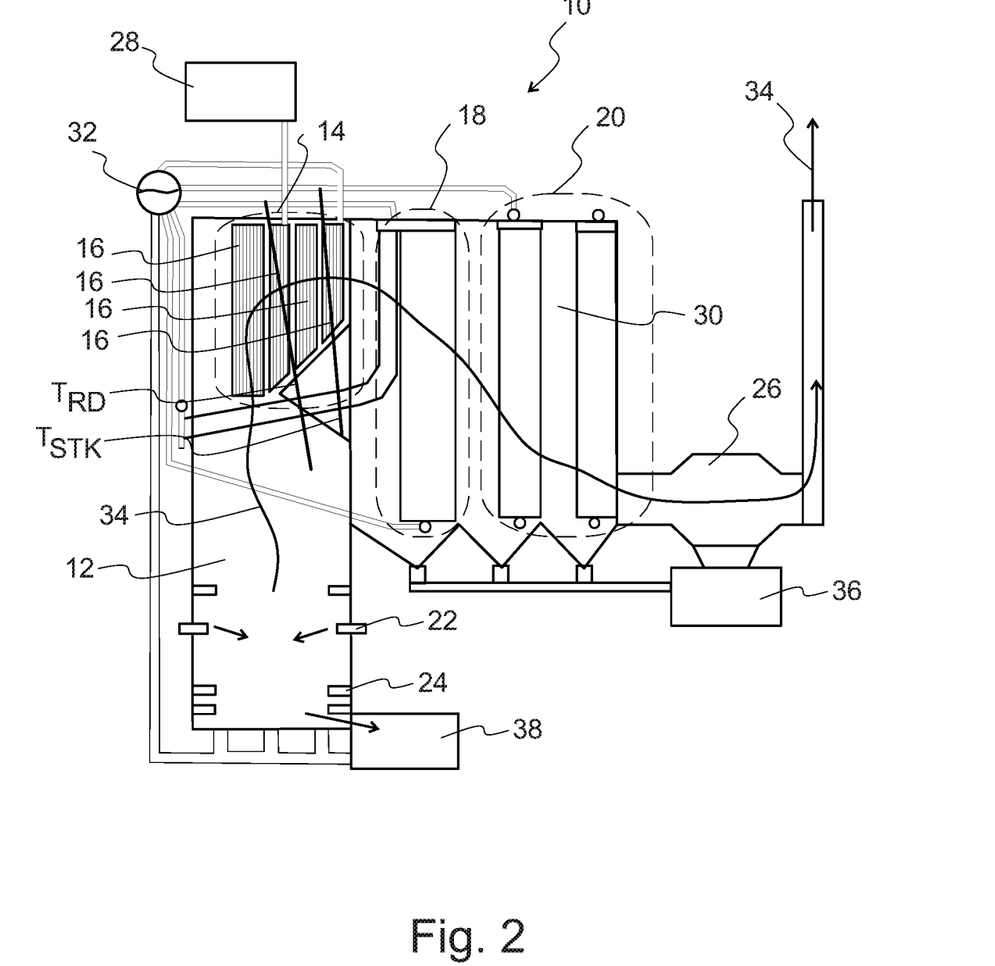
FIG. 2 shows the schematical view of FIG. 1 with the approximate location of a sticky area according to an example.

FIG. 2 shows one example of the approximate locations at which the temperature of the flue gases 34 correspond the sticky temperature $T_{STK}$ and the radical deformation temperature $T_{RD}$. The locations provide a relatively narrow area subject to fouling. Downstream of the location of the sticky temperature $T_{STK}$, the temperature of the flue gases 34 decreases.

Figure 3:
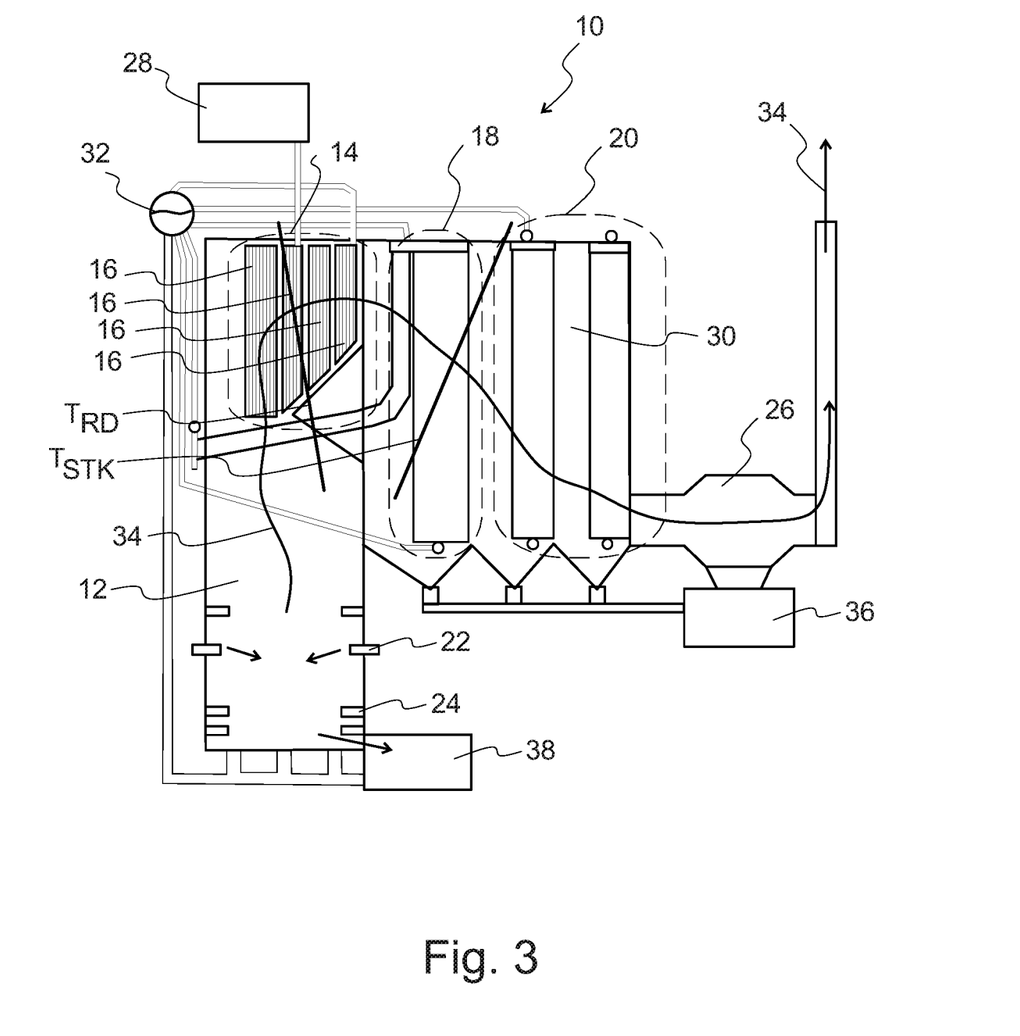
FIG. 3 shows the schematical view of FIG. 1 with the approximate location of a sticky area according to another example.

FIG. 3 shows another example of the approximate locations at which the temperature of the flue gases 34 correspond the sticky temperature $T_{STK}$ and the radical deformation temperature $T_{RD}$. The locations provide a relatively broad area subject to fouling and the risk of plugging at the boiler bank 18 is immediate. Downstream from the location of the sticky temperature $T_{STK}$, the temperature of the flue gases 34 decreases.

In the presented solution, the risk of plugging in the boiler bank 18 is estimated on the basis of the temperature difference $T_{D2}$ between the estimated sticky temperature $T_{STK}$ and the temperature $T_{FG}$ of the flue gases. The risk of plugging increases when the temperature difference $T_{D2}$ decreases. Preferably, the temperature $T_{FG}$ at the boiler bank 18 or the superheater 16 should be lower than the sticky temperature $T_{STK}$.

Preferably, when the temperature difference $T_{D2}$ decreases below a predetermined level, i.e. a temperature difference $T_{DMIN2}$, or settles in a predetermined temperature range, i.e. a temperature range $T_{R2}$, one or more control actions are performed to control the operation of the recovery boiler 10 such that the temperature difference $T_{D2}$ will increase above the predetermined level again or leave the predetermined temperature range. The predetermined level and/or the predetermined temperature range may be a parameter to be set and may be selected based on the structure of the boiler bank 18 or the superheater 16.

Economical or technical aspects in relation to the control actions performed may not justify increasing the temperature difference $T_{D2}$ to an excessively high level. Especially, purging fly ash would not necessarily be economically viable.

Preferably, when the temperature difference $T_{D2}$ increases above a predetermined level, i.e. a temperature difference $T_{DMAX2}$, or settles in a predetermined temperature range, i.e. a temperature range $T_{RM2}$, one or more control actions are performed to control the operation of the recovery boiler 10 such that the temperature difference $T_{D2}$ will decrease below the predetermined level again or leave the predetermined temperature range. The predetermined level and/or the predetermined temperature range may be a parameter to be set and may be selected based on the structure of the boiler bank 18.

The control action may be firstly, purging the fly ash, either completely or in part, without recirculating it or recirculating it only in part; and secondly, treating the fly ash in an ash treating process, either completely or in part; and thirdly, decreasing the temperature $T_{FG}$ of the flue gases at the boiler bank 18 by means of controlling the loading of the recovery boiler 10, for example the feeding of black liquor to the furnace 12; and fourthly, controlling combustion of black liquor in the furnace 12, and fifthly, cleaning the heat transfer surfaces of the boiler bank 18 and/or one or more of the superheaters 16 in the superheater area 14; and sixthly, a combination of one or more of the above-mentioned actions.

Preferably, the control action selected is either the decreasing of the temperature $T_{FG}$ at critical locations of the boiler bank 18 or the superheater area 1, or the cleaning of the heat transfer surfaces, or the purging or treating of the fly ash, for example ESP ash. Controlling the temperature $T_{FG}$ is realized, for example, by control and timing of the cleaning actions related to the heat transfer surfaces of the boiler bank 18 or one or more of the superheaters 16 in the superheater area 14. The cleaning actions may include sootblowing.

In relation to both the first example and the second example, the control action related to the purging of the fly ash collected is carried out by the ash collecting and conveying system including the electrostatic precipitator 26. The control action is carried out in such a way that the amount of fly ash either purged or fed to an ash treating process is controllably selected, depending on the temperature difference $T_{D1}$ and/or the temperature difference $T_{D2}$. For example, the proportion of the fly ash purged in relation to the fly ash collected is controlled, for example, in a continuous manner while the fly ash not purged is fed to the ash treating process. To increase the temperature difference $T_{D1}$ the proportion of the fly ash purged is increased, and vice versa. To increase the temperature difference $T_{D2}$ the proportion of the fly ash purged is increased, and vice versa.

Control of the recovery boiler 10, the deposit cleaning system and the ash collecting and conveying system is taken care of by an electronic control system based on, for example, microprocessors, control software and input/output devices enabling automatic control and human interaction by an operator. The electronic control system may have two or more separate units having differing functions and being connected with each other. Information, signals or measurement data related to the above-mentioned temperatures may be received in and processed by the control system. The electronic control system may be connected to or include sensor devices providing the above-mentioned information, signals or measurement data. Preferably, the electronic control system includes an analysis system for measuring or determining the K and/or Cl content of the fly ash. Alternatively, information or data related to the K and/or Cl content of the fly ash is received by the electronic control system. Control algorithms stored and run in the electronic control system are configured to determine the various temperature differences described above. Either the control unit or the operator makes a decision on the control actions required. The decision may be based on an optimization routine of the control unit for selecting a control action or control actions best suited for the situation.

Preferably, one or all methods steps of the presented solution, including sampling of the fly ash and/or establishing the K and/or Cl content, are carried out nonstop or regularly, once or twice a day, preferably several times a day, so that it is possible to perform control actions nonstop or regularly, preferably several times a day to reduce the risk of corrosion and/or plugging actively. According to some examples, the sampling and/or the determination of the K and/or Cl content may take place, for example, every 1 hour or every 4 or 8 hours, and according to another example, every 6 or 12 hours. The K and/or Cl content used in the presented solution may be a mean value based on several measurements, estimates or analyses.

The presented solution is not limited to the examples and alternatives explained above only. For example, the two above-mentioned examples of the presented solution may be combined wholly or in part to provide a more comprehensive solution. Thus, the examples and alternatives explained above are not to be considered as delimiting. The claims presented below define the extents of the presented solution.

The invention claimed is:

1. A method for controlling a recovery boiler, the recovery boiler comprising a furnace for black liquor combustion, a superheater area having one or more superheaters and a boiler bank recovering heat from a stream of flue gases coming from the furnace; the method comprising:
   estimating the sticky temperature $T_{STK}$ of the fly ash depositing on heat transfer surfaces of the superheater area and the boiler bank, the estimating being based on potassium (K) and chlorine (Cl) contents of the fly ash;
   measuring or estimating the temperature $T_{FG}$ of the flue gases flowing at the boiler bank, or the superheater area or one or more superheaters of the superheaters;
   evaluating a temperature difference $T_{D2}$ between the sticky temperature $T_{STK}$ and the temperature $T_{FG}$ of the flue gases; the temperature difference $T_{D2}$ providing an estimate of the risk of plugging at the boiler bank, or the superheater area or said one or more superheaters; and
   selecting a control action for performing control of the recovery boiler and influencing the temperature difference $T_{D2}$.

2. The method according to claim 1, further comprising:
   comparing the temperature difference $T_{D2}$ to a first predetermined temperature difference or a first predetermined temperature range; and
   selecting the control action for performing control of the recovery boiler in such a way that the temperature difference $T_{D2}$ increases when the temperature difference $T_{D2}$ is smaller than the first predetermined temperature difference or below the first predetermined temperature range.

3. The method according to claim 2, further comprising:
   comparing the temperature difference $T_{D2}$ to a second predetermined temperature difference or a second predetermined temperature range; and
   selecting the control action for performing control of the recovery boiler such that the temperature difference $T_{D2}$ decreases when the temperature difference $T_{D2}$ is bigger that the second predetermined temperature difference or above the second predetermined temperature range.

4. The method according to claim 1, wherein the control action is:
   controlling the proportion of fly ash being purged or being fed to an ash treating process adapted to remove potassium and/or chlorine from the fly ash, or controlling both of them;
   decreasing the proportion of the fly ash being purged or treated when the temperature difference $T_{D2}$ increases; and
   increasing the proportion of the fly ash being purged or treated when the temperature difference $T_{D2}$ decreases.

5. The method according to claim 1, wherein the control action is controlling the timing and procedure of cleaning actions related to the heat transfer surfaces of the superheater area, or the heat transfer surfaces of said one or more superheaters, or the heat transfer surfaces of the boiler bank.

6. The method according to claim 1, wherein:
   the recovery boiler further comprises at least one economizer recovering heat from a stream of flue gases coming from the furnace and an electrostatic precipitator collecting fly ash from the stream of flue gases; and
   the method further comprises measuring or determining the potassium and chlorine contents of the fly ash collected in the electrostatic precipitator, or caught in the boiler bank, or caught in the economizer, or carried by the stream of flue gases.

7. The method according to claim 1, the method further comprising measuring or estimating the temperature $T_{FG}$ of the flue gases upstream of the boiler bank or upstream of a superheater of the superheaters.

8. The method according to claim 1, wherein the estimation of the sticky temperature $T_{STK}$ is based on the potassium and chlorine contents and one or more of the following: the sodium content, carbonates content or the sulfates content of the fly ash.

9. The method according to claim 4, wherein the control action further comprises:
   collecting fly ash from the stream of flue gases with an ash collecting and conveying system; and
   removing potassium and/or chlorine from collected fly ash in the ash treating process and recirculating treated fly ash to black liquor before feeding the black liquor to the furnace.

10. The method according to claim 4, wherein the control action further comprises:
    collecting fly ash from the stream of flue gases with an ash collecting and conveying system; and
    changing, by means of the purging, the amount of fly ash recirculated back to black liquor before feeding the black liquor to the furnace.

* * * * *